A. COTOLI.
VARIABLE SPEED DRIVING MECHANISM.
APPLICATION FILED SEPT. 18, 1911.
1,033,991.
Patented July 30, 1912.
2 SHEETS—SHEET 1.
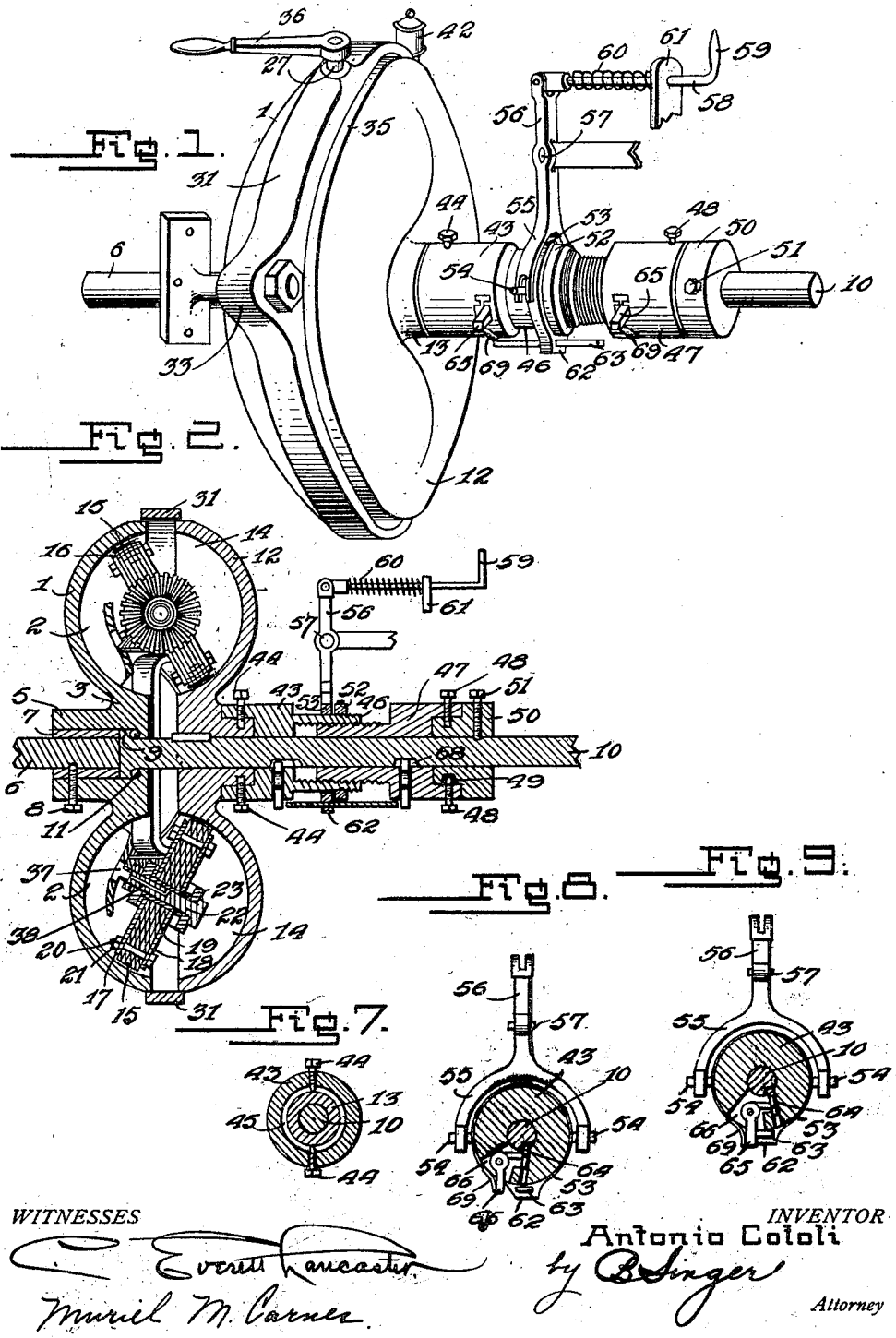

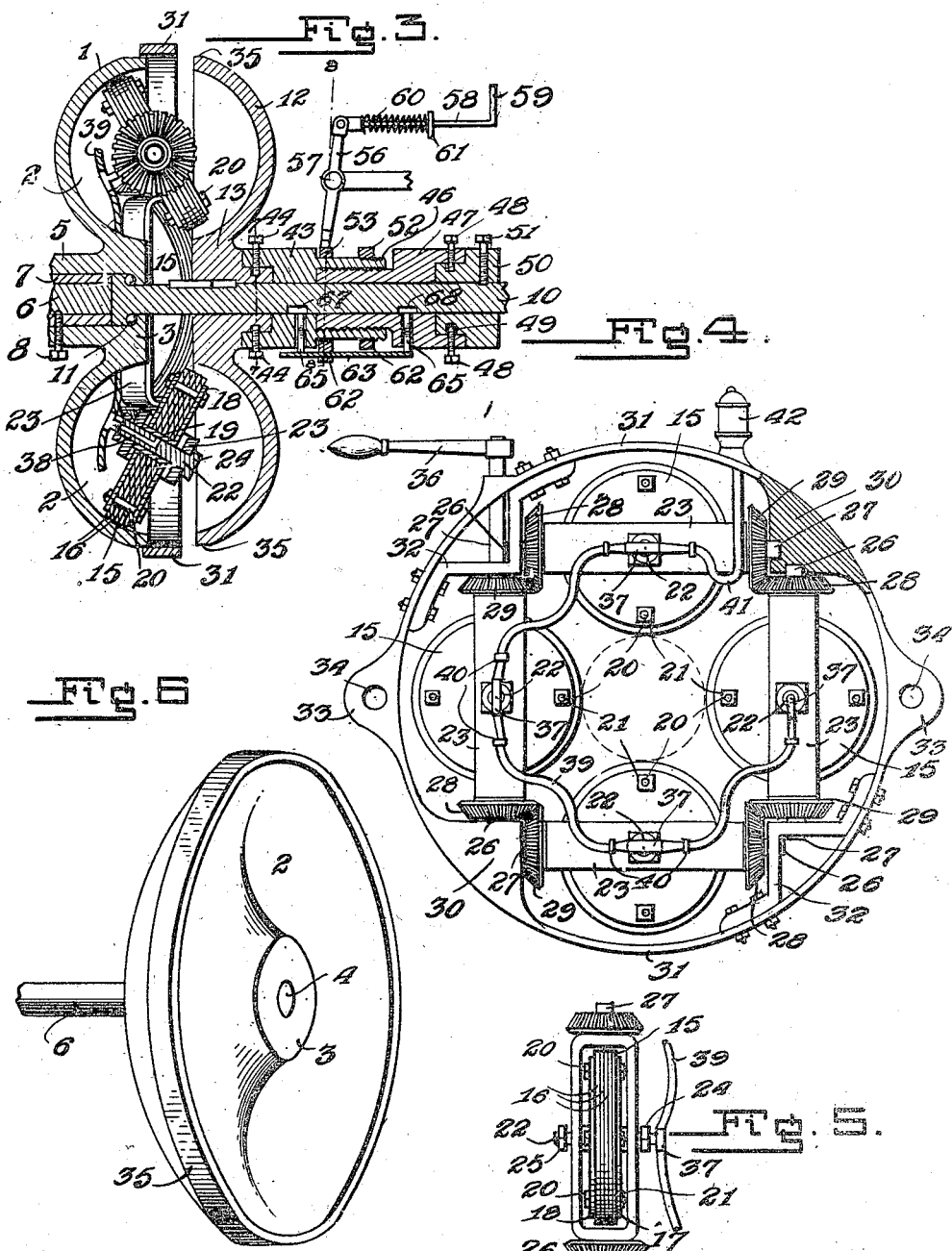

UNITED STATES PATENT OFFICE.

ANTONIO COTOLI, OF HABANA, CUBA.

VARIABLE-SPEED DRIVING MECHANISM.

1,033,991.  Specification of Letters Patent.  Patented July 30, 1912.

Application filed September 18, 1911. Serial No. 649,779.

*To all whom it may concern:*

Be it known that I, ANTONIO COTOLI, a subject of the King of Spain, residing at Muralla No. 111, *altos*, Habana, Cuba, have invented certain new and useful Improvements in Variable-Speed Driving Mechanism, of which the following is a specification.

This invention relates to new and useful improvements in variable speed driving mechanism, and the object thereof is to provide means, in a manner as hereinafter set forth whereby the driven shaft receives motion capable of successive and extensive graduation in variation of speed relatively to a driving shaft.

Another object of my invention is to provide the driving shaft with means, in a manner as hereinafter set forth, for readily coupling said shaft to and uncoupling it from the driven shaft, said means constituting a clutching means.

In the accompanying drawings: Figure 1 is a perspective view of a driving mechanism in accordance with this invention. Fig. 2 is a longitudinal section of said mechanism in clutching position. Fig. 3 is a similar section to Fig. 2, showing said mechanism in an unclutching position. Fig. 4 is a front view of the frame supporting the friction wheels forming part of said mechanism. Fig. 5 is a detail showing a side view of one of the friction wheels with its bearing frame. Fig. 6 is a perspective view of one of the friction disks of the driving mechanism. Fig. 7 is a cross-sectional view of the mechanism taken on the plane of the line 7—7 of Fig. 3. Fig. 8 is a cross-sectional view of said mechanism taken on the line 8—8 of Fig. 3. Fig. 9 is a cross-sectional view similar to Fig. 8, showing one of the clamping bolts of the clutching means, in a changed position.

The mechanism comprises a friction disk 1 having an annular recess 2, and a central body 3 provided with a central opening 4, said central body being extended to form a sleeve 5, which constitutes a bearing for the end of the driven shaft 6, by means of an interposed sleeve 7. The disk 1 and the sleeve 7 are fixed to the driven shaft 6 by means of a screw 8. The sleeve 5 also constitutes a seat for an end flange 9 of the driving shaft 10 which is mounted in the central opening 4, and the said flange 9 rests against the central body 3 and engages balls 11 in order to avoid friction between the disk 1 and the driving shaft 10. On this shaft 10 there is slidably keyed a friction disk 12 of the same form and exact diameter as friction disk 1, with the only difference that its central opening fits closely throughout its length on the shaft 10 and the said disk 12 is placed in a reversed position relatively to disk 1, so that its annular recess 14 remains in front of the annular recess 2 of disk 1 and spaced away from the same.

Between disk 1 and disk 12 there is arranged a series of friction wheels 15 which are adapted to transmit the rotary movement of disk 12 to disk 1 by frictional engagement with both disks. In the drawings, a series of four friction wheels 15 are shown, each of which is formed by a plurality of leather disks 16 fastened by means of four screws 20, and nuts 21 between two metallic disks 17, 18, one of which 18 has a central sleeve 19 crossing disk 17 and disks 16, and the sleeve 19 receives a shaft 22 which is rigidly mounted across the sides of a rectangular bearing frame 23. The said shaft 22 is provided with a head 24 at one end, a nut 25 which screws up at the other end of said shaft 22, being provided to hold it in position in the said frame 23. The upper and lower portions of each bearing frame 23 are provided each with journals 26, 27 respectively, and in these journals are keyed beveled wheels 28, 29 respectively, the journals being in alinement with each other, in order to form a revolving shaft for each bearing frame 23. The four frames 23 are rectangularly grouped so that each beveled wheel 28 meshes with a wheel 29 of the next frame and each beveled wheel 29 of the same frame may mesh with the beveled wheel 28 of the following frame, and the journals 26 and 27 are mounted, in projections 30 in the supporting frame 31 and the other two opposite pairs in two angular-shaped plates 32, to the frame 31. This frame 31 has two flanges 33, each one with a hole 34 by means of which the said frame is held in a fixed position between the two disks 1 and 12, so that the inner surface of the frame 31 engages with the slightly beveled edge 35 of disks 1 and 12. The friction wheels 15 are equal in diameter to the cross section of the annular recess 2 or 14 in order that in the normal position of disk 12 there may be a frictional engagement of all the wheels 15 with the inner face of said annular recesses 2 and 14, irrespective of the position of said wheels relatively to the disks 1 and 12. This inclination of the wheels 15 is changed by means of one of the journals 27 by a handle 36. When the handle 36 is turned, the frames 23 revolve through the action of the beveled gears 28, 29 and therefore the inclination of the wheels 15 is changed.

The series of friction wheels 15 is provided with lubricating means which comprises a T-shaped pipe 37 in threaded engagement with the shaft 22 of each wheel at one end thereof, and through said pipe a lubricant comes into a hollow 38 in said shaft which has its outlet opening at one side of this shaft. Said tubes 37 are joined together excepting two of them, by three flexible india rubber pipes 39 passing through clasps 40 fixed on one side of each frame 23, one of the pipes 37 being closed at one end and the other pipe 37 being connected by means of an india rubber pipe 41 with the bottom of a receptacle 42, containing a lubricant, and which is secured on the upper portion of frame 31.

The clutching means is constructed in the following manner: Over a recess of central body 13 there is disposed a sleeve 43, mounted on the driving shaft 10 and fixed longitudinally relatively to the friction disk 12 but free to revolve on the same by means of two screws 44 which go through the sleeve 43 in opposite directions and the inner ends of which rest loosely in an annular groove 45. The said sleeve 43 is provided at its end opposite 13 with a reduced cylindrical portion 46 of greater internal diameter than the sleeve 43 and which constitutes a nut having threaded engagement with a screw formed by the recessed portion of another sleeve 47, mounted on the driving shaft 10, and fixed longitudinally by means of two screws 48 extending through said sleeve 47 and the interior ends of which rest loosely in an annular groove 49, of a third sleeve 50, fixed on the driving shaft 10, by means of a screw 51. Over the end portion of nut 46 there is mounted in threaded engagement a collar 52 and over the remaining portion of same nut 46 there is slidably mounted another collar 53, provided with two journals 54, at the ends of the horizontal diameter, said journals entering loosely into openings formed at the end of a bifurcation 55 which constitutes the lower end of a lever 56, pivoted at a fixed point 57. The lever 56 is articulated to a horizontal bar 58 provided with a handle 59 and subjected to the action of a spring 60 and has one end fixed to this and the other end rests on a cross piece 61, through which passes the bar 58, and which is fixed to the frame. The collar 53 has a lug 62 provided with a small bar 63 parallel to shaft 10 and each one of the sleeves 43 and 47 is provided with a clamping bolt 64 mounted at the inner end of an angular lever 65, pivoted into one of the faces of a recess 66, formed in each sleeve, and said recess 66 incloses the clamping bolt 64 and lever 65. The outer end of this lever 65 projects out of the sleeve and in its normal position the clamping bolts 64 are engaged in longitudinal grooves 67, 68, formed in the periphery of the shaft 10 by means of the action of a spring 69. The small bar 63 is of a length somewhat less than the distance between the two levers 65 of sleeves 43 and 47, when these sleeves are in clutching position.

The operation of the described mechanism is as follows: When the driving shaft 10 revolves, the disk 12 is revolved and wheels 15 are adapted to frictionally engage with the inner face of the annular recesses 2 and 14, since the said wheels 15 are in a certain inclined position relatively to the disks 1 and 12 (Figs. 2 and 3). Movement of the disk 12 is imparted to the disk 1 through the intermediacy of the wheels 15, which revolve responsive to their frictional engagement with disk 12 and impart movement to disk 1 through their frictional engagement therewith, the two disks revolving in counter directions. In view of the foregoing, and upon inspection of Fig. 2, it will be seen that, with the planes of rotation of the wheels 15 inclined with respect to the axis of the drive shaft 10 and diverging from the planes of rotation of disk 12 toward the plane of rotation of disk 1, a reduction of speed occurs between disk 12 and disk 1. The speed of disk 1 may be gradually increased from a diminishing speed to an equal speed of rotation between the disks, when the plane of rotation of each wheel 15 is parallel to the axis of drive shaft 10. As soon as the planes of rotation of the wheels 15 become inclined with respect to the axis of shaft 10 and converge toward each other from disk 12 to disk 1, then the disk 1 rotates faster than disk 12. These variations of speed take place through the change of frictional contact of the wheels with the disk surfaces with respect to the axis of rotation of a driving and driven element.

When the plane of rotation of all of the wheels 15 is parallel to the plane of rotation of each disk 12 and 1, then no motion is transmitted from one to the other and it is obvious that the wheels 15 may be rendered inactive as a motion transmitting means directly after the greatest increase of speed from disk 12 to disk 1 has been obtained, by merely rotating the frames of wheels 15 to bring their planes of rotation in parallel relation to each other.

In order to render the wheels 15 inactive as motion transmitting means from one disk to the other, while the shaft 10 continues to rotate, the mechanism carried by and associated with the drive shaft 10 may be operated to withdraw disk 12 from frictional engagement with wheels 15. The operation of this mechanism is as follows:—Assuming that motion is being transmitted from one disk to the other, the relative position of parts being such as illustrated in Fig. 2 of the drawing, by actuating the bar 58 against action of spring 60, the lever 56 is swung on its pivot and collar 53 moved in an axial direction toward disk 12. Inasmuch as the sleeve 43 normally rotates with the shaft 10, through clamping bolts 64, the actuating lever of such bolt will ultimately contact with bar 63 and be actuated to withdraw bolt 64, and retard movement of the sleeve 43. Immediately thereafter the threaded portion of sleeve 47, which is retained against axial movement and rotated with shaft 10 through its clamping bolt 64, acts upon the internal threaded portions of the sleeve 43 and draws the said sleeve in an axial direction toward the sleeve 47. The movement of sleeve 43 as described, withdraws disk 12 from frictional contact with wheels 15 and hence they are rendered inactive as motion transmitting means between the disks. The disk 12, however, continues to rotate with shaft 10, while the sleeve 43, carrying with it the collar 53, presents the rod 63 in the path of movement of the actuating members 65 of the bolt 64 associated with sleeve 47. When this member 65 contacts with rod 63 the bolt 64 is withdrawn and the collars 43 and 47 come to rest, the shaft 10 continuing to rotate. The relative position of parts ultimately assumed, responsive to actuation through rod 58 as described, is shown in Fig. 3 of the drawing, in which both clamping bolts 64 are held out of their grooves in the shaft 10 by the rod 63.

Any suitable catch mechanism, not shown in the drawing, may be provided to retain the bar 58 in a position resisting movement responsive to spring 60 when it is desired that the wheels 15 shall not transmit movement from one disk to the other. When it is again desired to render the wheel 15 active as motion transmitting means between the disks 12 and 1, the rod 58 is released and moves the lever 56 responsive to spring action 60. This action moves collar 53 toward stationary collar 52 and consequently releases bar 63 from the member 65 allowing the clamp bolt 64 of sleeve 43 to become active and hence motion of shaft 10 is transmitted to sleeve 43. Thereupon, the sleeve 43 moves axially away from sleeve 47 through its threaded engagement therewith and causes disk 12 to be moved toward and ultimately contacts with the wheel 15.

As soon as the rod 63 permits actuation of the clamping bolt of sleeve 47, the said sleeve also rotates with shaft 10 and consequently the axial feed of sleeve 43 stops when the disk is brought into contact with the peripheries of the wheel 75, with the relative position of parts as shown in Fig. 2 of the drawing.

What I claim is:

1. A variable speed mechanism comprising in combination, driving and driven shafts, disks fixed to said shafts and having circular concave friction faces, pairs of friction wheels engaging said faces and geared to each other within said concave faces, and means for swinging said friction wheels with their respective planes of rotation intersecting the plane of rotation of either disk, or in parallel relation to the plane thereof in unison, substantially as described.

2. A variable speed mechanism comprising in combination, driving and driven shafts, disks fixed to said shafts and having circular concave friction faces, pairs of friction wheels engaging said faces, rectangular shafting geared to said wheels, disposed within said faces and adapted to revolve, and means connected with said shafting for adjusting the position of said wheels in unison, substantially as described.

3. A variable speed mechanism comprising in combination, driving and driven shafts, disks fixed to said shafts and having circular concave friction faces, pairs of friction wheels engaging said faces, rectangular shafting geared to said wheels, disposed between said faces, and adapted to revolve a ring disposed outside of said faces for carrying said wheels and shafting, and means mounted on said ring and connected with said shafting to adjust said wheels in unison, substantially as described.

4. A variable speed mechanism comprising in combination, a driving shaft, a driven shaft, a friction disk slidably keyed to said driving shaft, a driven friction disk for said driven shaft, friction wheels interposed between said disks, a nut connected with said driving disk, a second nut having threaded engagement with said first mentioned nut and connected with said shaft, devices for locking said nut with said shaft, manual means for actuating said devices, and a member carried by one of said nuts for automatically actuating said means, substantially as described.

5. A variable speed mechanism comprising in combination, a driving shaft, a driven shaft, a friction disk slidably keyed to said driving shaft, a driven friction disk for said driven shaft, friction wheels interposed between said friction disks, a pair of members having threaded engagement with each other, one member being connected with said driving disk and one member with said shaft and devices for locking or unlocking said members with and from said shaft, substantially as described.

6. A variable speed mechanism comprising in combination, a driving shaft, a driven shaft, a friction disk keyed to said driving shaft, a driven friction disk for said driven shaft, friction wheels interposed between said disks, a pair of members having threaded engagement with each other, one member being rotatably connected with said driven disk and the other member being rotatably carried with the shaft and devices for locking either or both of said members to said shaft, substantially as described.

A variable speed mechanism comprising in combination, a driving and a driven disk, friction wheels interposed between said disks to transmit motion from one to the other, a driving shaft connected with the driving disk, a pair of members having threaded engagement with each other, one member being rotatably connected with the driving disk and the other member being rotatably connected with the shaft, devices for locking either or both of said members to said shaft, and mechanism actuated upon movement of said members for adjusting said devices.

In testimony whereof I have hereunto set my hand in presence of two subscribing witnesses.

ANTONIO COTOLI.

Witnesses:
C. E. GUYAUT,
N. ASCOT.